March 12, 1957
E. W. LARSEN
2,784,598
VIBRATING APPARATUS
Filed March 7, 1952
4 Sheets-Sheet 1
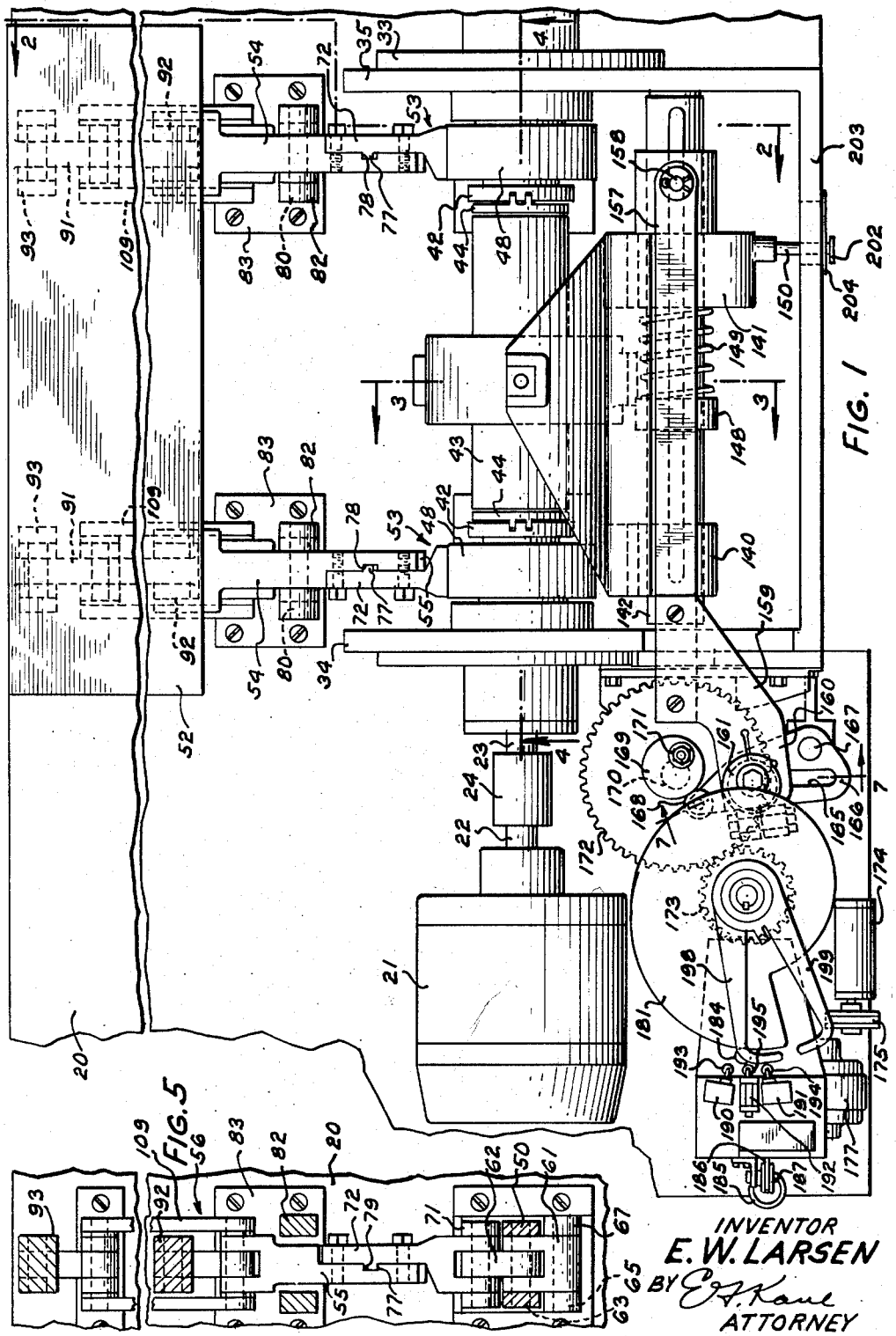
INVENTOR
E. W. LARSEN
BY
ATTORNEY March 12, 1957
E. W. LARSEN
2,784,598
VIBRATING APPARATUS
Filed March 7, 1952
4 Sheets-Sheet 2
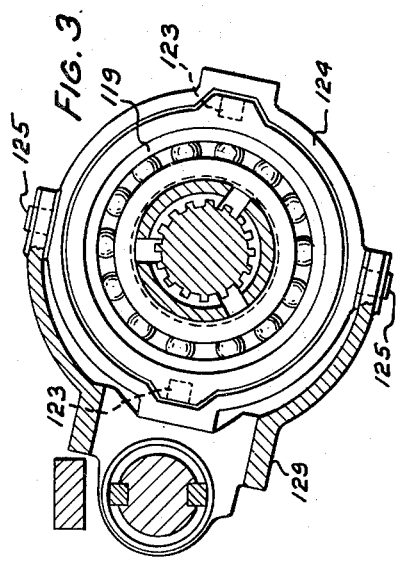
FIG. 3
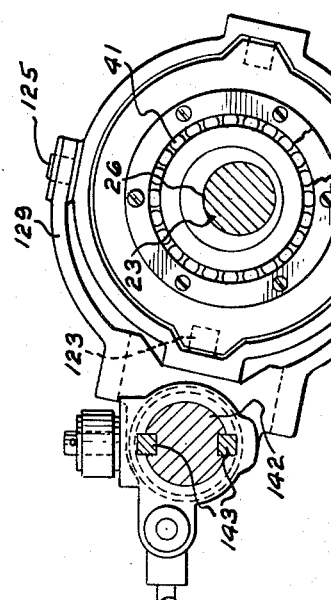
FIG. 2
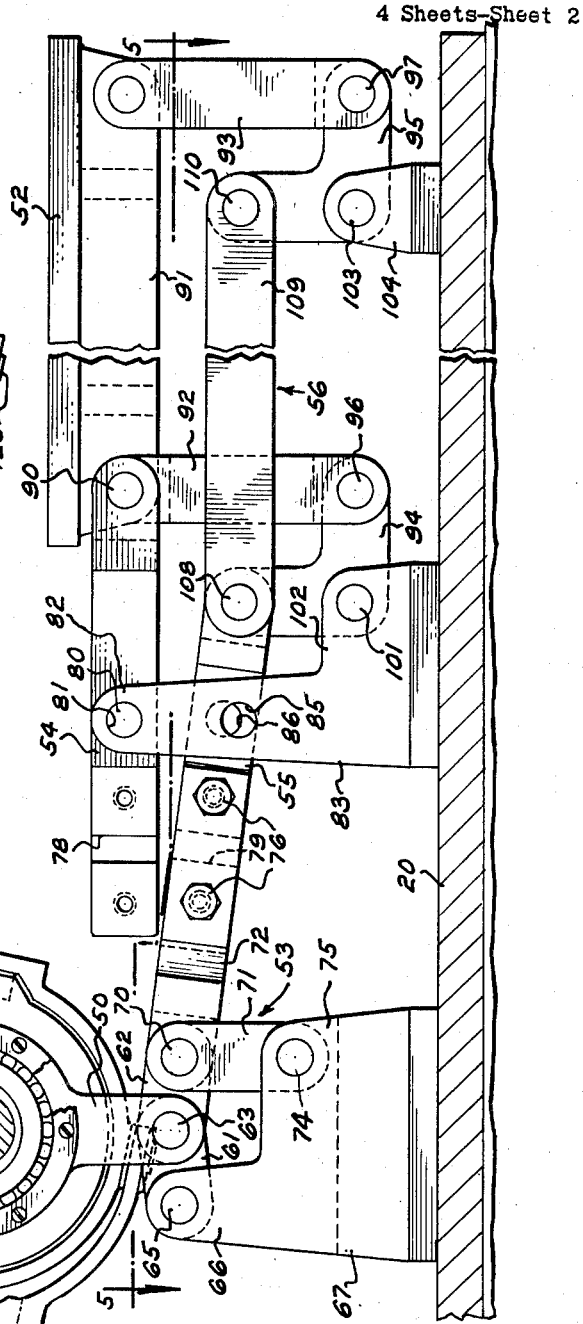
INVENTOR
E. W. LARSEN
BY E. H. Kane
ATTORNEY

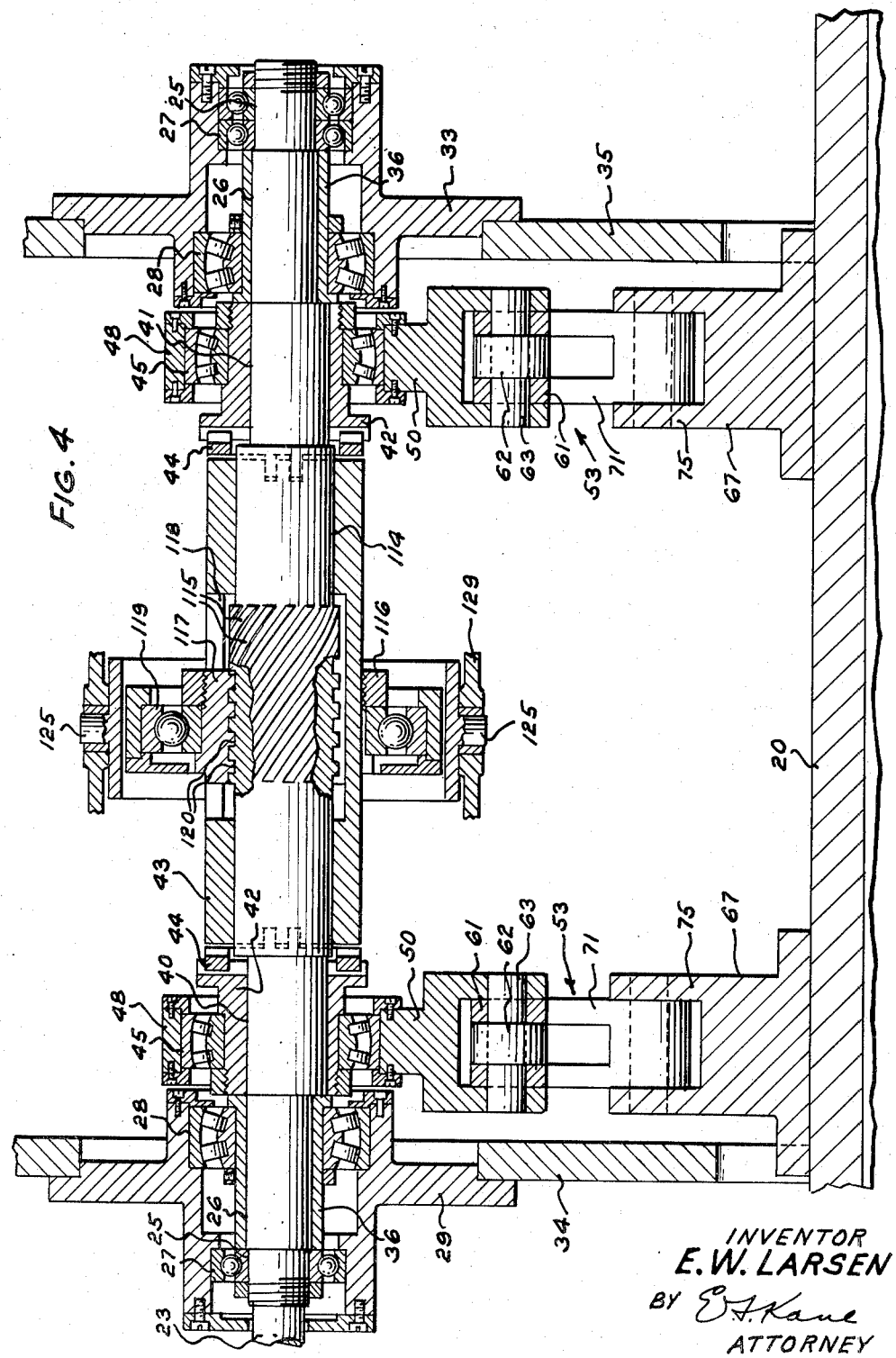

March 12, 1957 E. W. LARSEN 2,784,598
VIBRATING APPARATUS
Filed March 7, 1952 4 Sheets-Sheet 4
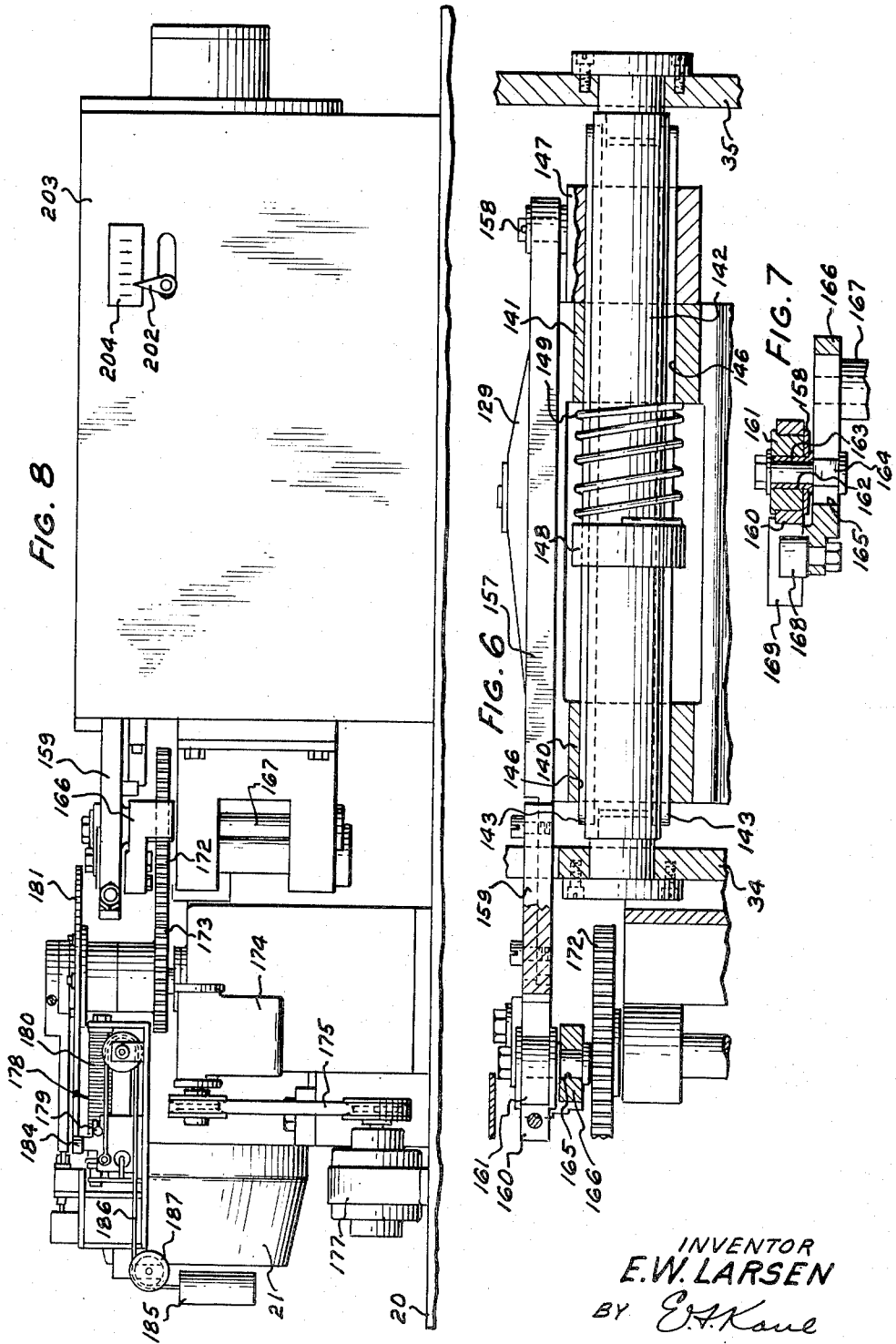
INVENTOR
E. W. LARSEN
BY E. H. Kane
ATTORNEY ём
United States Patent Office 2,784,598
Patented Mar. 12, 1957

2,784,598

VIBRATING APPARATUS

Einer W. Larsen, Elmhurst, Ill., assignor to Western Electric Company, Incorporated, New York, N. Y., a corporation of New York Application March 7, 1952, Serial No. 275,443

12 Claims. (Cl. 74—26)

This invention relates to vibrating apparatus, and more particularly to high frequency vibrating apparatus.

In the manufacture of electrical apparatus for use in airplanes, ships, et cetera, the apparatus must be constructed to operate under all conditions to which it may be subjected in service, and accordingly, it is necessary to test the apparatus while subjecting it to such vibrations and shocks as it may receive in use. There have been mechanisms which are successful, but for selectively creating horizontal vibrations and vertical vibrations at a very high frequency known mechanisms are quite complex. Another problem in the vibration testing art is that of creating high frequency vibrations without undue wear on the vibrating apparatus, in which bearings of the prime mover have been a limiting factor.

An object of the invention is to provide new and improved vibrating apparatus.

Another object of the invention is to provide high frequency vibrating apparatus.

Another object of the invention is to provide a simple and practicable apparatus for selectively vibrating articles in horizontal and vertical directions at predetermined amplitudes and high frequencies in simulation of various conditions to which the articles may be subjected in service.

A further object of the invention is to provide apparatus for vibrating articles at very high frequencies without excessive wear of the apparatus.

An apparatus illustrating certain features of the invention may include a table vibratable by a linkage system. There also may be provided an eccentric drive driven at a predetermined rate of speed for driving a toggle joint linkage between opposite overcenter positions. The toggle joint linkage may be selectively connected to the linkage system to vibrate the table horizontally and to vibrate the table vertically.

A complete understanding of the invention may be obtained from the following detailed description of an apparatus forming one embodiment thereof, when read in connection with the accompanying drawings, in which Fig. 1 is a fragmentary plan view of an apparatus embodying the features of the invention;

Fig. 2 is an enlarged, fragmentary, vertical section taken along line 2—2 of Fig. 1;

Fig. 3 is an enlarged, fragmentary, vertical section taken along line 3—3 of Fig. 1;

Fig. 4 is an enlarged, fragmentary, vertical section taken along line 4—4 of Fig. 1;

Fig. 5 is an enlarged, fragmentary, horizontal section taken along line 5—5 of Fig. 2;

Fig. 6 is a fragmentary, vertical, partially sectional view of a portion of the apparatus shown in Fig. 1;

Fig. 7 is an enlarged, fragmentary, vertical section taken along line 7—7 of Fig. 1, and Fig. 8 is a front elevation of the apparatus shown in Fig. 1.

Referring now in detail to the drawings, there is shown therein an apparatus for vibrating a supporting table through a cycle of from, for example, 120 to nearly 0 vibrations per second and including an elasticity compensating mechanism. The apparatus includes a main base member 20 (Figs. 1, 2 and 4) having an electric main drive motor 21 mounted upon it, a shaft 22 of the motor being in axial alignment with a main driving shaft 23 of the apparatus and connected rigidly thereto by a coupling 24. The shaft 23 is journalled at opposite ends, each end having two reduced concentric portions 25 and 26 journalled in ball and roller bearing assemblages 27 and 28, respectively, carried by bearing blocks 29 and 33. The bearing blocks 29 and 33 are mounted in side frame members 34 and 35, respectively, suitably attached to the main base member 20, the inner races of the roller bearing assemblages 28 being fixed to bearing members 36 surrounding the inner reduced portions 26 of the shaft. Adjoining the inner reduced concentric shaft portions are aligned eccentric shaft portions 40 and 41 surrounded by aligned, shouldered, eccentric bushings 42 coupled rigidly to a sleeve 43 by toothed clutch rings 44. Upon the outer peripheries of the bushings 42 are rotatably mounted roller bearing assemblages 45, which are surrounded by bearing rings 48. The eccentric shaft portions 40 and 41 and the eccentric bushings 42 are so proportioned that when the bushings are held in a predetermined position with respect to the shaft 23, the outer surfaces of the bushings are concentric with the axis of the shaft, and, when the bushings are in this position, rotation of the shaft and the bushings together will not result in movement being imparted to the bearing rings 48.

Extending from the lower side of the bearing rings 48 are arms 50 (Figs. 2 and 4). Since the bearing rings 48 surround the eccentric bushings 42, the eccentric motion of the bushings during the rotation of the shaft is transmitted to the rings, and consequently, to the arms 50, thereby reciprocating the arms 50. The reciprocatory motions of the arms 50 are transmitted to an article support or table 52 through toggle-joint linkages 53 selectively connectible rigidly to arms 54 and arms 55 of identical linkage systems 56 to vibrate the table 52 horizontally and vertically, respectively.

Each toggle joint linkage 53 includes links 61 and 62 connected at one end of each pivotally to one another and the arm 50 by a pin 63. The other ends of the links 61 are connected by pins 65 to clevises 66 of a bracket 67 fixed to the base plate 20. The other ends of the links 62 are connected by pins 70 pivotally to links 71 and 72. The links 71 are connected by pins 74 to clevises 75 of the brackets 67, and permit the pins 70 to shift the pivot points of the links 72 as the toggle-joint linkages 53 are actuated. The links 72 may be selectively connected rigidly by cap screws 76 to the links 54 or the links 55. Tongues 77 (Fig. 1) formed on the links 72 fit interlockably into grooves 78 and 79 formed in the links 54 and 55, respectively. The length of the arms 50 relative to the positions of the axis of rotation of the shaft 23 and the toggle-joint linkages 53 is such that the linkage is moved equidistantly to each side of center by rotation of the shaft. This makes the excursion of the table equal on each side of center, and makes the frequency of vibration of the table twice the R. P. S. of the shaft 23.

For moving the table 52 vertically, the links 72 (Fig. 2) are connected to the links 55, and pins 80 are inserted through bores 81 to connect the links 54 pivotally to clevises 82 of brackets 83 secured to the base plate 20. To adapt the apparatus for horizontal vibration of the table 52, the links 72 are disconnected from the links 55, the pins 80 are removed from the bores 81 and are inserted into bores 85 and 86 formed in the clevises 82 and the links 55, respectively, and the links 72 are connected rigidly to the links 54.

The links 54 (Fig. 2) are connected pivotally by pins 90 to a flange 91 of the table 52, and parallel, vertical links 92 and 93 connected pivotally at their upper ends to the flange 91 are connected pivotally at their lower ends to bell-crank levers 94 and 95 by pins 96 and 97, respectively. Pins 101 connect the levers 94 to clevises 102 of the brackets 83, and pins 103 connect the levers 95 to clevises 104 fastened rigidly to the base plate 20. Pins 108 secure links 109 pivotally to the links 55 and the bell crank levers 94, and pins 110 secure the links 109 pivotally to the bell crank levers 95.

In order to impart either horizontal or vertical movements to the table 52, the adjustable eccentric bushings 42 may be adjusted upon eccentric shaft portions 40 and 41, whereby the degree of eccentricity controls the amplitude of movement of the table. For the purpose of adjusting the eccentric bushings 42 during operation of the apparatus, the following mechanism is provided. Formed on a central shaft portion 114 (Fig. 4) are righthand spiral threads 115 of suitable lead and length, on which is a nut 116 having three circumferentially spaced splines or keys 117 extending radially from its periphery. The keys 117 are slidable in three similarly spaced keyways 118 formed longitudinally in the clutch sleeve 43, and have thread segments 120 meshing with the threads 115. Thus, when the nut 116 is shifted axially to the right or left, as viewed in Fig. 4, the sleeve 43 is rotated relative to the shaft and the eccentric bushings 42 are rotated or adjusted with respect to the eccentric shaft portions 40 to vary the amplitude of the throw of the bushing 42 and eccentric shaft portions 40.

A ball bearing assemblage 119 has its inner race attached to the nut 116 and its outer race pivotally connected by means of trunnions 123 (Fig. 3) to a ring 124, which, in turn, is pivotally connected by means of trunnions 125 to a yoke 129, thus providing a universal coupling between the ball bearing assemblage 119 and the yoke. The yoke 129 is provided with spaced bearing blocks 140 and 141 (Figs. 3 and 6), which are keyed for movement longitudinally of a fixed shaft 142 secured at opposite ends to the side frame members 34 and 35, the shaft carrying two diametrically opposed keys 143, which are entered in similarly arranged keyways 146 in the bearing blocks. Similarly keyed on the shaft 142 to the right of the bearing block 141 is a slide block 147, which, in the operation of the apparatus, is reciprocated upon the shaft 142. Fixed to the shaft 142 intermediate the bearing blocks 140 and 141 is a collar 148, and surrounding the shaft between opposed faces of the collar and the bearing block 141 is a compression spring 149, which normally urges the yoke 129 to the right, as viewed in Fig. 6.

The eccentricity of the bushings 41 may be effected by a movement of the yoke 129 longitudinally of the shaft 23. This movement of the yoke 129 will result in a movement of the nut 116 on the spiral threads 115 of the shaft. Thus, by means of the sleeve 43 connected to the nut 116 and the coupling between the sleeve and the eccentric bushings 41, a relative rotation will be obtained between the nut and the shaft 23 and thereby a turning of the eccentric bushings on the eccentric portions of the shaft.

Reciprocation of the yoke 129, which controls the amplitudes of vibrations of the table 52, is effected by a main control link 157 (Figs. 1, 6 and 7) secured by a pin 158 to the slide block 147, which, in the manner previously described, may be locked to the yoke 129. Fixed to the link 157 is an arm 159. The arm 159 has a split collar 160 mounting an adjustable bearing bushing 161 in any selected position of rotation. The bushing 161 has a flange at its upper end (Fig. 7) and formed eccentrically in and extending through the bushing is a circular aperture 162 for freely receiving a cylindrical portion of a sleeve 163 having a flange at its lower end. Between the flange of the sleeve 163 and the lower surfaces of the bushing 161 is a washer 158 having an eccentrically formed aperture which also engages the lower surface of the arm 159 and which is maintained in alignment with the eccentric aperture 162 in the bushing by securing the washer and bushing together in a suitable manner after assemblage so that they may be rotated as a unit to a selected position. Fitted in the aperture of the sleeve 163 and the aperture in the lower washer is a cylindrical portion of a headed pin 164, which is provided with two substantially flat surfaces adapted to engage surfaces of an arcuately formed slot 165 formed in a lever 166 pivoted on a rod 167 carried on the frame of the apparatus. At its upper end, the pin 164 is screw-threaded to receive a nut, by means of which, together with a washer bearing on the upper annular end surface of the sleeve 163 and a lower head on the pin, the sleeve, the pin, and the lever 166 may be clamped together as a unit with the bushing 161 free to rotate upon the periphery of the sleeve in the operation of the apparatus. It will be apparent that by loosening the clamp scerw 160, the bearing bushing 161 may be rotated on the arm 159 to a selected position, and due to its eccentric bearing on the sleeve 163, the extension arm 159 of the link 157 and the parts movable therewith, including the nut 116, will be shifted longitudinally.

The free end of the lever 166, previously mentioned, carries a cam roller 168, which rides on the peripheral surface of a rotatable cam 169 under the urging of the compression spring 149. The cam 169 is carried upon a shaft 170 having an eccentric portion 171. The shaft 170 is driven through a train of gears 172 and 173 (Fig. 1) from a gear reducer 174 driven by belt and pulleys, indicated at 175, in turn driven by a reversible, constant speed electric control motor 177. Thus, upon rotation of the cam 169, the lever 166 will be oscillated about the rod 167 and motion will be transmitted through the link 157 to the yoke 129 to shift the nut 116 axially along the spiral thread 115 of the shaft 23. When the nut 116 is shifted axially of the thread 125, relative rotation will be effected between the shaft 23 and the bushings 41. In this manner, when the nut 116 is moved axially of the shaft 23, a gradual variation of the effective eccentricity of the driving portions of the shaft is effected, and consequently, the amplitude of the vibrations of the table 52 will be gradually varied in a selected range determined by the area and amplitude of movement of the nut 116. The amount of reciprocation imparted to the combined levers 159 and 157 will depend upon the position of the pin 164 along the slot 165 of the lever 166 and the particular contour of the cam 169, the pin being predeterminedly adjusted and clamped in position.

It will be understood that with an accurate adjustment of the bushing 161 in the arm 159 and an accurate setting of the pin 164 along the slot 165 of the lever 166, in combination with a predetermined contour of the cam 169, the required change in the effective eccentricity of either of the bushings 42 and 43 may be had to compensate for the change in overthrow of the table 52 during its movements due to the elasticity of the various members connecting the shaft 23 to the table 52 as the rate of vibration changes.

The speed of the main drive motor 21, which determines the frequency of vibrations of the table 52, is controlled by a potentiometer, indicated in general at 178 (Fig. 8), having a brush 179 movable back and forth across a fixed surface or winding 180 of the potentiometer. A potentiometer controlling cam 181 is secured to the low speed shaft of the speed reducer 174 and is thus driven from the reversible, constant speed electric control motor 177. A cam roller 184 engaged by the cam 181, and mounted to move with the brush 179, drives the brush in one direction across the winding 180 of the potentiometer 178. The winding 180 is connected in circuit with the main drive motor 21 and controls the speed of this motor, thereby regulating the frequency of vibrations imparted to the table 52. The cam roller 184 is constantly urged against the cam 181 by a suspended weight 185, which also tends to move the brush in a direction opposite to that in which it is moved by the cam 181, the weight being attached to one end of a flexible member 186 guided over pulleys 187 and attached at its opposite end to the mounting which supports the cam roller 184 and the brush 179.

The operation of the reversible motor 177 is under control of a pair of motor reversing microswitches 190 and 191 and an intermediate limit or motor cut-out switch 192, which are, in turn, controlled by three roller-type actuators 193, 194 and 195, respectively. Fixed to the shaft which carries the potentiometer controlling cam 181 are two adjustable switch-controlling arms 198 and 199 having arcuate shaped outer ends adapted to alternately engage the switch actuators 193 and 194 of the switches 190 and 191, respectively, to reverse the supply of current to the control motor 177, thus to reverse the direction of rotation of the main control lever cam 169 and the potentiometer cam 181. In their positions shown in Fig. 1, the arms 198 and 199 have been rotated clockwise and the arm 198 has just actuated the microswitch 191, and consequently, the rotation of the two arms and the associated potentiometer controlling cam 181 will be initiated in a counterclockwise direction to cause the arm 199 to actuate the microswitch 190. Thus, the drive to the cams 169 and 181, which control the range of amplitude and frequency of vibrations of the table 52 will again be reversed. The switch 192, which is included in the circuit to the motor 177 and arranged in the path of either of the arms 198 and 199, serves, in case the microswitches 190 and 191 fail at any time, to completely break the supply of current to the motor.

Fixed to and reciprocating with the yoke bearing block 141 is a pointer 202, which is mounted for movement outside a forward frame member 203 of the apparatus (Figs. 1 and 8), the pointer cooperating with a scale plate 204 attached to the frame member. In the operation of the apparatus, the pointer 202 and the scale plate will indicate the amplitude of vibration of the table 52 at very low frequencies. At these low frequencies, it will be readily apparent there is practically no overthrow due to elasticity. At higher frequencies, the scale and pointer will provide, by its movement, an indication of the degree of compensation being effected due to elasticity by moving to the left to indicate the reduction in eccentricity which is necessary to compensate for the increased overthrow at higher frequencies.

*Operation*

To vibrate the table 52 vertically, the pins 80 are placed in the holes 81 in the clevises 82 to hold the links 54 against endwise reciprocation and to permit pivotal movement thereof on the pins 80. The links 72 are connected to the links 55 and the motor 21 is energized to rotate the shaft 23 at a predetermined speed. The eccentric portions 40 and 41 of the shaft 23 are revolved and the eccentric bushings 42 are revolved with the eccentric portions 40 and 41 to move the ring 48 and the arm 50 up and down, as viewed in Fig. 2. The arm 50 moves the toggle-joint linkage 53 from one side of center to the other side of center and back again during each revolution of the shaft 23, the extreme limits on each side of center being equal. As the toggle-joint linkage moves from one side of center to center, the bell crank levers 94 and 95 are pivoted in one direction which moves the table 52 vertically depending upon the direction in which the levers 94 and 95 are moved. Then as the toggle-joint linkage moves from center to the opposite side of center, the bell crank levers 94 and 95 are pivoted in the opposite direction to move the table 52 in the opposite direction. Then, as the direction of movement of the arm 50 is reversed, the toggle-joint linkage moves back to center, which again reverses the direction of the movement of the bell crank levers 94 and 95 and the table 52, and this direction of movement is again reversed as the toggle joint linkages 53 move to the original positions thereof. Thus, for each revolution of the shaft 23, the table is moved up and down twice. As the table 52 is moved up and down, endwise movement thereof is limited by the links 54 and the pins 80, and the links 54 and the table 52 being slightly oscillated about the pins 80. This horizontal movement is slight since the pins 80 are spaced substantially from the pins 90 which connects the links 54 to the table.

For horizontal vibration of the table 52, the cap screws 76 are removed from the links 55, the pins 80 are removed from the holes 81 in the clevises 82 and the links 54 and are placed through the bores 85 in the clevises 82 and the bores 86 in the links 55 to hold the links 55 against endwise movement. The cap screws 76 then are threaded into bores in the links 54 to secure the links 72 to the links 54. The article to be tested is fastened to the table 52 and the motor 21 is started. The eccentric portions 41 and 42 of the shaft 23 and the eccentric collars 43 revolve together and reciprocate the rings 48 and the arms 50 to repeatedly move the toggle-joint linkages 53 from one side of center to the opposite sides of center and back. This reciprocates, primarily in an endwise direction, the links 54 to oscillate the table about the pins 96 and 97, the links 92 and 93 serving to impart primarily a horizontal reciprocation to the table 52.

The above-described apparatus is simple in construction and operation, and is relatively inexpensive in its construction and also provides very high frequency vibrations with a relatively low frequency eccentric drive. Since the vibrations of the table per unit of time are double the revolutions of the shaft 23 per the same unit of time, the speed of the shaft 23 may be kept sufficiently low that damage to its supporting bearings is avoided and still provide for higher frequencies of vibration of the table than possible with past known apparatus, about twice the maximum frequency of past known apparatus being obtainable with the above-described apparatus with no damage to the bearings. Furthermore, since the testing (acceleration) forces vary as the first power of the amplitude and with the square of the frequency, this apparatus may operate with much lower amplitudes of vibrations than the previously known apparatus and yet produce even higher testing forces.

Certain features of the apparatus described herinabove are disclosed and claimed in my Patents 2,438,755 and 2,438,756 for "Vibrating Apparatus."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A vibrating machine, which comprises a support, a toggle-joint linkage having a fixed center and movable back and forth from one side of center to the opposite thereof for vibrating the support, an eccentric strap having an eccentric rod attached to it for actuating the toggle-joint linkage, an eccentric mounting the eccentric strap and rotatable on a fixed axis so located that the eccentric rod moves the toggle-joint linkage between extremities equidistant from the center of the linkage on opposite sides of the center, and means for adjusting the throw of the eccentric to vary the amplitude of vibration of the support.

2. A vibrating machine, which comprises a support, eccentric means, bearing means mounting the eccentric means for rotation on a fixed axis, means for adjusting the eccentricity of the eccentric means relative to said axis of rotation, means for rotating the eccentric means at a predetermined high rate of speed, an eccentric strap and rod driven by the eccentric means, and toggle-joint linkage means driven back and forth equidistantly from the center thereof by the rod for vibrating the support with uniform amplitude at a frequency double the frequency of revolution of the eccentric means.

3. A vibration machine, which comprises a crankshaft having an eccentric portion, fixed bearing means mounting the crankshaft for rotation, a bushing having eccentric inner and outer surfaces mounted on the eccentric portion of the crankshaft, adjustable means mounting the bushing for rotation with the crankshaft, means variable in speed for rotating the crankshaft, a support, toggle-joint linkage means having a fixed center for oscillating the support, and an eccentric strap and rod assemblage mounted on the bushing connected to the toggle-joint linkage means for driving the linkage, said assemblage being of such a length that it moves the toggle-joint linkage means equal distances on each side of the center thereof to cause the frequency of vibration of the support to be twice the rate of revolution of the shaft.

4. A vibrating machine, which comprises a table for supporting an article to be tested, a plurality of links supporting the table, a plurality of levers supporting the links, means selectively operable for oscillating the levers, means selectively operable for holding the levers against oscillation, means selectively operable for oscillating said links about the levers, and means selectively operable for limiting oscillating movement of the links about the levers.

5. A vibrating machine, which comprises a table for supporting an article to be tested, a pair of links supporting the table, a pair of bell crank levers supporting the links, means selectively operable for oscillating the bell crank levers, means selectively operable for holding the bell crank levers against oscillation, means selectively operable for oscillating said links about the bell crank levers, and means selectively operable for limiting oscillating movement of the links about the bell crank levers.

6. A vibrating machine, which comprises a table for supporting an article to be tested, a pair of links supporting the table, a pair of bell crank levers supporting the links, means operable for oscillating the bell crank levers, means selectively operable for holding the bell crank levers against oscillation, means operable for oscillating said links about the bell crank levers, means selectively operable for limiting oscillating movement of the links about the bell crank levers, an electric motor, and toggle-joint linkage means driven by the motor for driving selectively said lever-driving means and said link-driving means.

7. A vibrating machine, which comprises a table, a lever, an arm connecting the table pivotally to the lever, means selectively operable for holding the lever against pivotal movement, means selectively operable for guiding the arm in a direction generally perpendicular to the portion of the lever to which the arm is connected and for oscillating the arm about the lever, and a drive selectively connectible alternatively to the lever and to the arm-guiding means.

8. A vibrating machine, which comprises a table disposed horizontally, a bell crank lever mounted pivotally on a horizontal axis in a general position in which one arm thereof extends vertically and the other arm thereof extends horizontally, an arm connecting the table pivotally to the horizontal arm of the lever, means selectively operable for holding the lever against pivotal movement, a link connected pivotally to the table and the arm, means selectively operable for preventing reciprocable movement of the link and simultaneously permitting pivotal movement of the link about a horizontal axis spaced substantially from the table, and a reciprocable drive selectively connectible alternatively to the lever and to the link.

9. A vibrating machine, which comprises a table disposed horizontally, a pair of bell crank levers mounted pivotally on spaced horizontal axes in parallel positions in which one arm of each extends vertically and the other arm of each extends horizontally in the same direction, a pair of links connecting the table pivotally to the horizontal arms of the levers, means selectively operable for holding the levers against pivotal movement, a link connected pivotally to the table, means selectively operable for preventing longitudinal movement of the second-mentioned link and a reciprocable drive selectively connectible alternatively to the levers and to the second link.

10. A vibrating machine, which comprises a table disposed horizontally, a pair of bell crank levers mounted pivotally on spaced horizontal axes in general positions in which one arm of each extends vertically and the other arm thereof extends horizontally, a link connecting the vertical arms together, a pair of link means connecting the table pivotally to the horizontal arms of the levers, means selectively operable for holding the levers against movement and permitting oscillatory movement thereof, a link extending generally horizontally connected pivotally to the table and one of said first-mentioned links, means selectively operable for preventing longitudinal movement of the last-mentioned link, and a reciprocable drive selectively connectible alternatively to the lever and to the last-mentioned link.

11. A vibrating machine, which comprises a table disposed horizontally, a pair of bell crank levers mounted pivotally on horizontally spaced horizontal axes in general positions in which one arm of each extends vertically and the other arm thereof extends horizontally in the same direction, a pair of links connected at the upper ends thereof to the table and at the lower ends thereof to the horizontal arms of the levers, means selectively operable for holding the levers against pivotal movement, a link connected pivotally to the table, means selectively operable for preventing longitudinal movement of the second-mentioned link, and a toggle-joint linkage drive selectively connectible alternatively to the levers and to the second link.

12. A vibrating machine, which comprises a table, means including a pair of substantially aligned links connected to one side of the table forming with the table a linkage system, means selectively operable for moving the links primarily longitudinally to move the table transversely of the plane of the table, and means selectively operable for oscillating the links to move the table along the plane of the table.

References Cited in the file of this patent

UNITED STATES PATENTS

| 641,977 | Lampert | Jan. 23, 1900 |
| 830,425 | Ford | Sept. 4, 1906 |
| 2,438,756 | Larsen | Mar. 30, 1948 |
| 2,494,413 | Slettengren | Jan. 10, 1950 |